United States Patent [19]

Shutic et al.

[11] Patent Number: 5,667,342

[45] Date of Patent: Sep. 16, 1997

[54] METHOD AND APPARATUS FOR UNLOADING POWDER COATING MATERIAL FROM A DRUM SHAPED CONTAINER

[75] Inventors: Jeffrey R. Shutic, Wakeman; Kevin Lenhart, North Ridgeville, both of Ohio

[73] Assignee: Nordson Corporation, Westlake, Ohio

[21] Appl. No.: 399,441

[22] Filed: Mar. 7, 1995

[51] Int. Cl.$^6$ .................................................. B65G 53/36
[52] U.S. Cl. ......................... 406/122; 406/139; 414/433; 222/164; 222/167; 222/637
[58] Field of Search .................................. 406/108, 122, 406/139, 140; 414/417, 433; 222/164, 165, 167, 637, 630

[56] References Cited

U.S. PATENT DOCUMENTS

| | | | |
|---|---|---|---|
| 1,527,128 | 2/1925 | Durouaux et al. | 222/167 |
| 2,286,776 | 6/1942 | Williams et al. | |
| 2,678,238 | 5/1954 | Schütz | 222/167 |
| 3,181,842 | 5/1965 | Eckert | 414/433 |
| 3,854,634 | 12/1974 | Hart. | |
| 4,302,134 | 11/1981 | Johnson et al. | 406/108 |
| 4,449,880 | 5/1984 | Hartman. | |
| 4,505,623 | 3/1985 | Mulder. | |
| 4,615,649 | 10/1986 | Sharpless. | |
| 4,744,701 | 5/1988 | Chasteen | 406/140 |
| 4,860,928 | 8/1989 | Shimazu | 222/167 |
| 4,986,717 | 1/1991 | Cummins et al. | 222/164 |
| 5,015,126 | 5/1991 | Kramer. | |
| 5,271,695 | 12/1993 | Bischof et al. | |
| 5,458,264 | 10/1995 | Schaffer et al. | 222/637 |

FOREIGN PATENT DOCUMENTS

| | | |
|---|---|---|
| 2040383 | 4/1991 | Canada. |
| 0184994 | 9/1985 | European Pat. Off. |
| 1913026 | 9/1970 | Germany. |
| 50-30286 | 7/1975 | Japan. |
| 52-111182 | 9/1977 | Japan. |
| 2066213 | 7/1981 | United Kingdom ................ 222/167 |
| 2195975 | 4/1988 | United Kingdom. |

OTHER PUBLICATIONS

Gema Volstatic MPS Catalog.

*Primary Examiner*—Gary C. Hoge
*Attorney, Agent, or Firm*—Howard M. Cohn

[57] ABSTRACT

An apparatus and method for unloading powder from a drum shaped container permits the container to be loaded vertically onto an unlaoding assembly but then supported in a tilted unloading position while the container is being rolled about its axis. A cover assembly is secured to the top end of the container. The cover has channels on its interior surface disposed about a central opening. The cover rolls with the drum. The cover assembly has a central outlet tube from the central opening and a bearing assembly mounted to the outlet tube. The bearing assembly includes a tongue which is supported in a fixed position as the drum is rolled to receive powder deposited on the tongue from the channels. A bleed tube blows powder from the tongue into the inlet of a pump mounted to the bearing assembly to pump powder from the drum. A second embodiment is directed to a system for automatically transferring drum shaped containers fitted with the cover assembly to an unloading station where the container is supported with an axis therethrough tilted with respect to horizontal. Powder is evacuated from within container while the container is being rolled. Then, each drum-shaped container is individually transferred from unloading station.

15 Claims, 11 Drawing Sheets

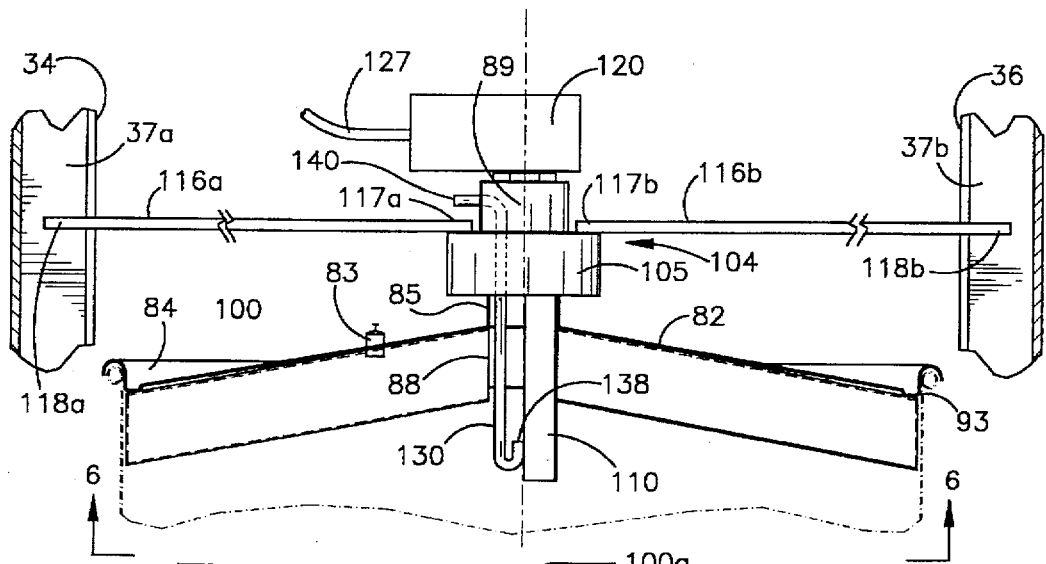
Fig.5
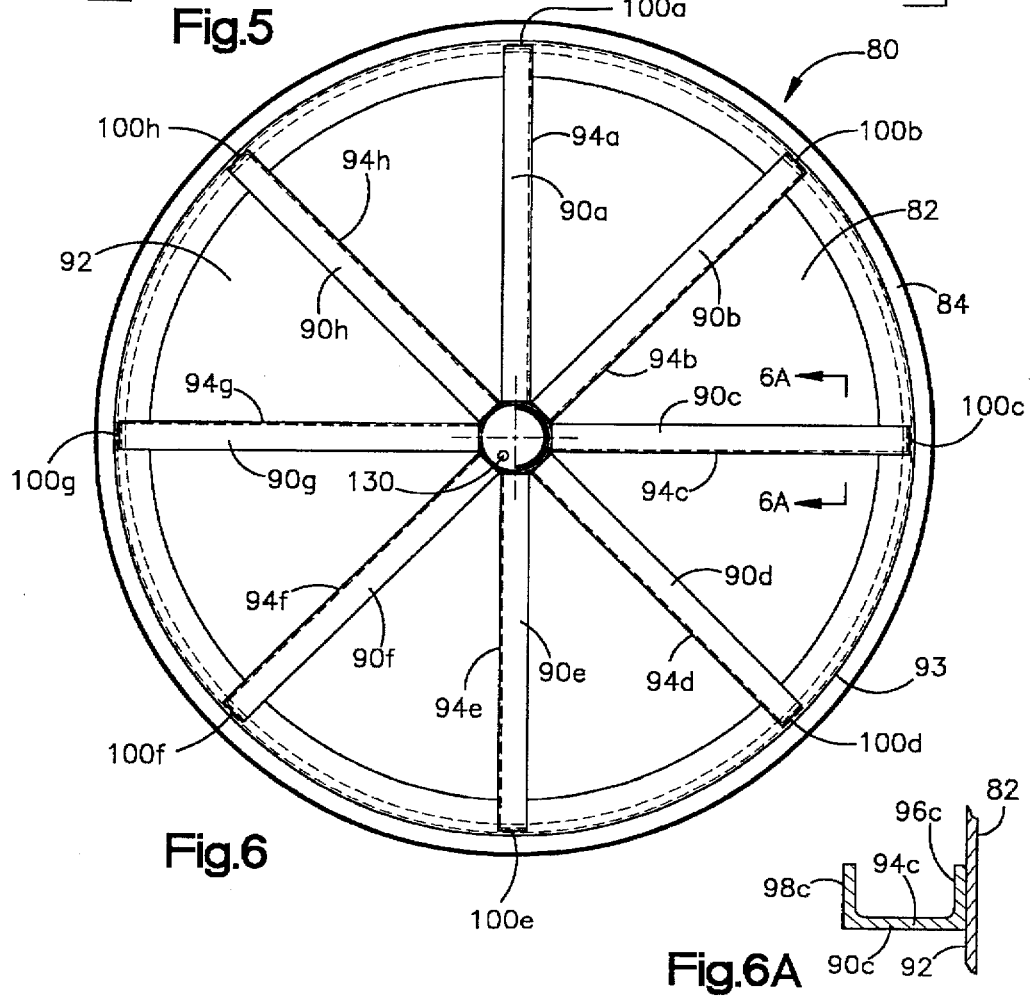
Fig.6
Fig.6A

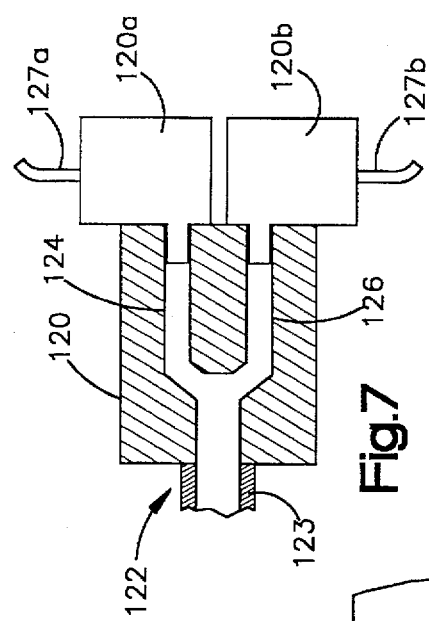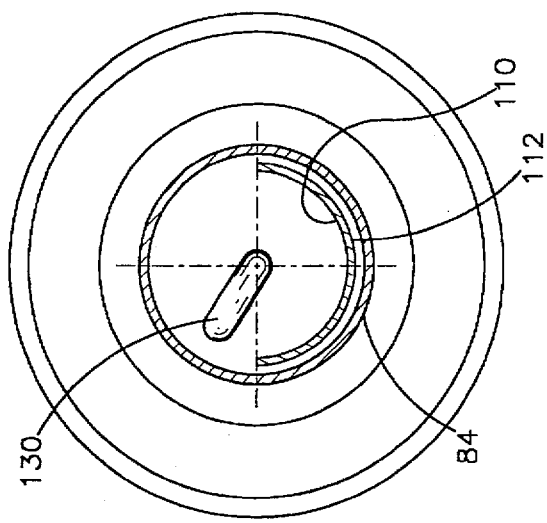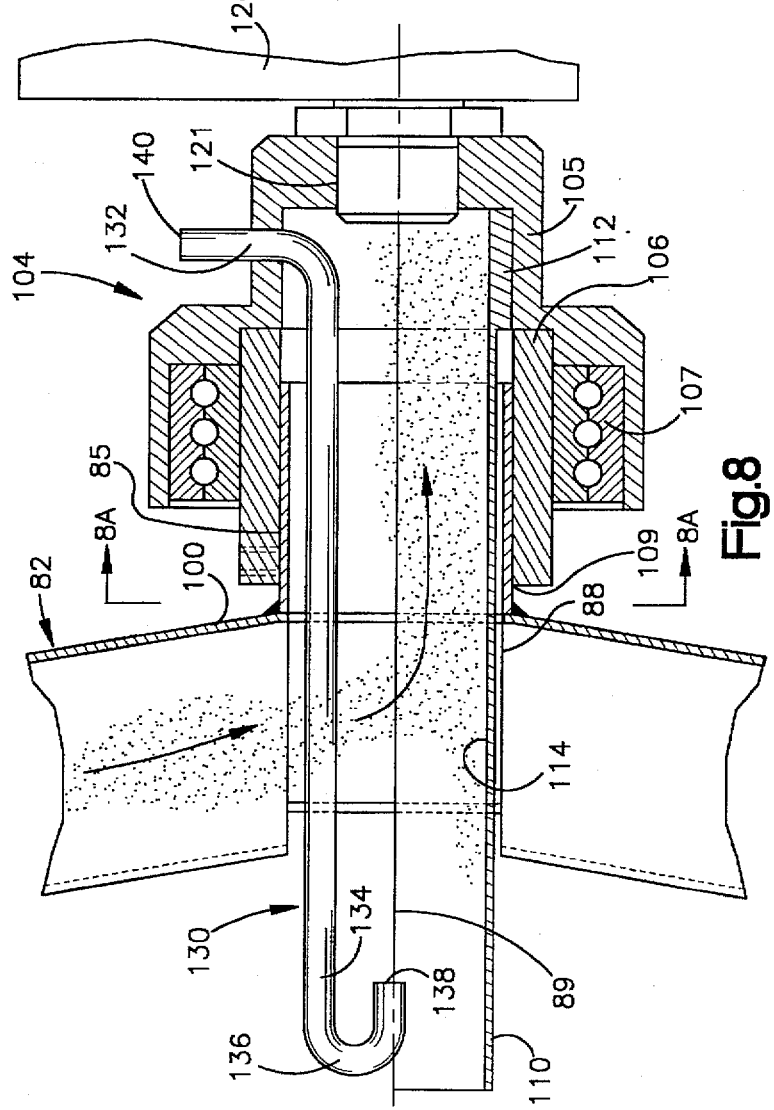

METHOD AND APPARATUS FOR UNLOADING POWDER COATING MATERIAL FROM A DRUM SHAPED CONTAINER

BACKGROUND OF THE INVENTION

This invention relates to an apparatus and method for unloading powder from a drum shaped shipping container. More specifically, the invention covers an apparatus and method for unloading powder coating material from a rotating drum shaped shipping container.

In electrostatic finishing with a powder coating material, the powder is typically delivered to a spray gun from a hopper. For example, the powder can be transferred from a shipping drum to a hopper associated with a powder spray system, as disclosed in U.S. Pat. No. 4,505,623, assigned to Nordson Corporation, the assignee of this invention. The 4,505,623 patent, which is hereby incorporated by reference in its entirety, shows and describes the withdrawal of the powder from a shipping drum being supported with its axis at a 45 degree angle to vertical. The powder is then transferred to a feed hopper and pumped from the feed hopper to a spray gun for application to a substrate.

Various difficulties have been experienced in transferring the shipping powder from the drum. For example, the powder is often compacted during shipping and cannot be mixed with the air to fluidize the powder and enhance discharge. This problem is more pronounced with certain difficult to handle powders, such as acrylic based powders, or powders which have relatively smaller particle size distribution. The latter powders are particularly difficult to fluidize. In some cases the shipping drum is vibrated to loosen the powder. However, as the powder is evacuated from the drum, the vibration tends to compact the material and form a solid arch about the evacuated area around the inlet opening of the suction tube which draws the powder from the shipping drum. Then, the operator must manually free the powder and direct it toward the suction tube, or alternatively, the suction tube must be moved to the location of the powder. Thus, even though the vibrating device, as shown in the 4,505,623 patent, is intended as an automatic transport device, it sometimes must be manned by an operator to ensure that substantially all of the powder is removed from the container.

OBJECTS AND SUMMARY OF THE INVENTION

In view of the foregoing, it is an object of the present invention to provide an apparatus and method for unloading all of the powder from an original drum type shipping container with a minimum of human operator attention.

It is a further object of the present invention to provide an apparatus and method for rolling a drum shaped shipping container while unloading powder coating material contained therein.

It is a still further object of the invention to provide a system for automatically delivering drum shaped shipping containers to a station where the shipping container is tilted to an unloading position and continuously rolled while the powder is being removed.

In accordance with the one preferred embodiment of the invention, an apparatus for unloading powder from a drum shaped container has a stationary support structure and a drum tilting structure tiltably secured thereto for tilting the drum shaped container from a substantially vertical loading position to an unloading position whereby the top end is lower than the bottom end of the drum shaped container.

Also in accordance with the invention, a cover assembly is secured to the top end of the drum shaped container for conveying the powder from the drum. The circular cover has a central opening and a plurality of elongated channels extending radially outward from the central opening for capturing the powder as the drum shaped container rolls about its axis. A stationary tongue shaped member extends from a bearing assembly through the central opening and into the drum shaped container for collecting the powder captured by the channels when the drum shaped container is rolling. Also, a bleeder tube is mounted in the bearing assembly and overlies the tongue shaped member. Pressurized makeup air is directed in through the inlet opening of the tube and across the tongue member in the direction of the outlet tube to blow powder collected on the tongue member into the inlet opening of the bearing assembly.

According to the invention, a transfer pump is connected to the outlet opening of the circular lid for transferring the powder into a feed tube for delivery to a powder hopper or powder spray gun.

Further in accordance with the invention, a method of unloading powder from a drum shaped container, comprises the following steps. First, the cover assembly is secured to the first end of the drum shaped container with the channels of the cover assembly disposed within the container. Next, the drum shaped container is loaded into an unloading apparatus and supported in a tilted unloading position. Continuing, the drum shaped container is rolled allowing the powder to entrain air. The powder within the container is captured by the channels and deposited on the stationary tongue shaped member. Finally, the powder is transported from the tongue shaped member of the drum shaped container via a suction force through the outlet opening of the cover assembly, and is then transferred through a feed tube to a powder hopper.

According to another embodiment of the invention, a system for unloading powder from a drum shaped container includes a downward sloping delivery station from which the drum shaped containers will freely roll to a downward sloping holding station. The drum shaped containers are then transfered one at a time, to an unloading station. The drum container is rolled at the unloading station while the powder is evacuated from the cover assembly. The empty drum shaped container is then transferred from the unloading station to an outfeed station located directly adjacent to the unloading station.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 5 shows a side, elevational view of the cover assembly of the present invention;

FIG. 6 shows a bottom view of the cover assembly taken along line 6—6 of FIG. 5;

FIG. 6A is a side elevational view, taken along line 6A—6A of FIG. 6, showing the cross section of a channel secured to the underside of the cover assembly;

FIG. 7 shows an alternative embodiment for mounting two powder pumps to the cover assembly in accordance with the invention;

FIG. 8 is a detailed view, in partial cross-section, of a bearing assembly for mounting a powder pump to the cover assembly with the unit in the unloading position of FIG. 10;

FIG. 8A is a side elevational view, taken along line 8A—8A of FIG. 8, showing the relation of an air bleeder tube to a tongue assembly through a central opening of the cover assembly;

DESCRIPTION OF THE PREFERRED EMBODIMENT OF THE INVENTION

Figure 1:
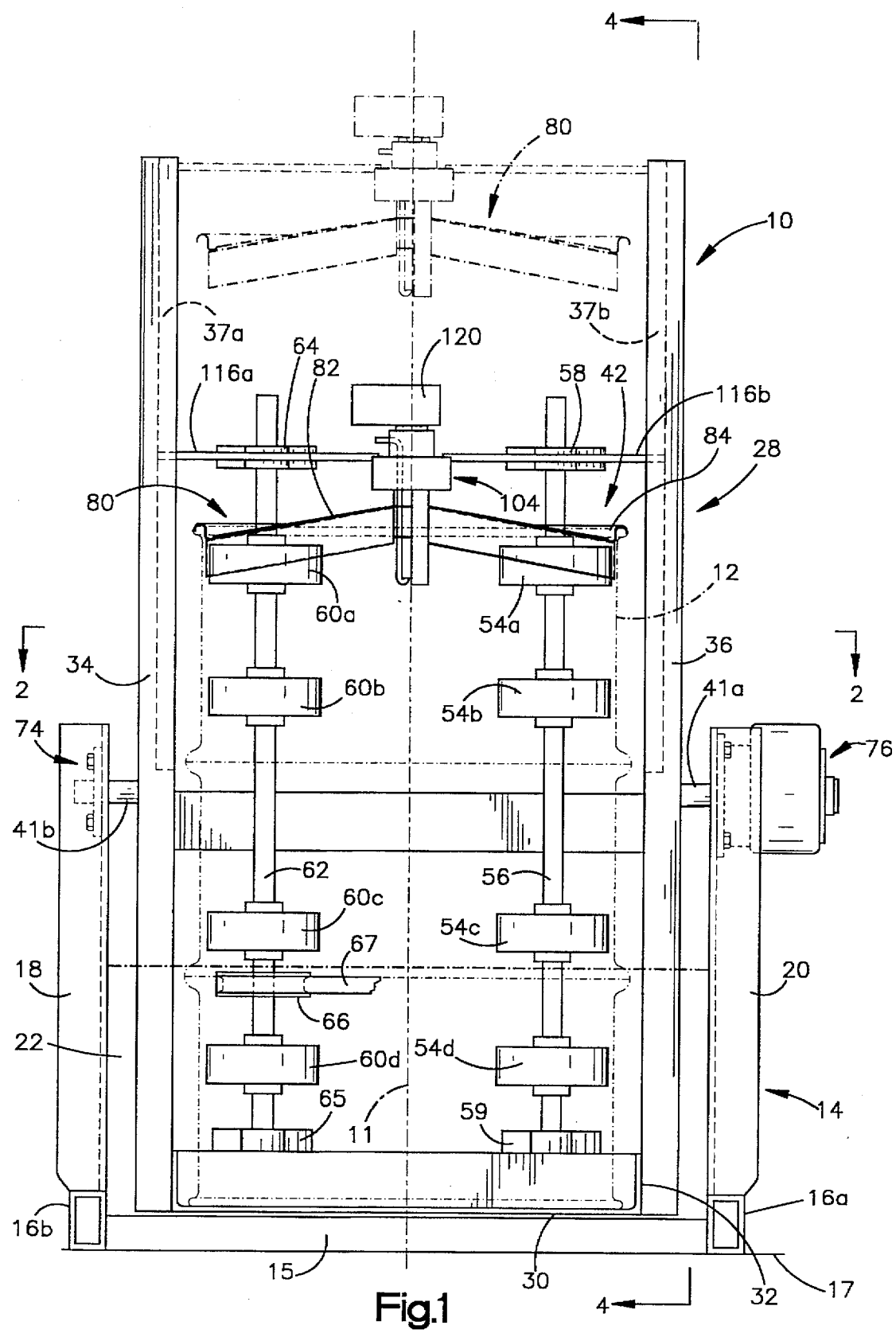
FIG. 1 is a side elevational view of a drum unloader in accordance with the present invention.
Figure 10:
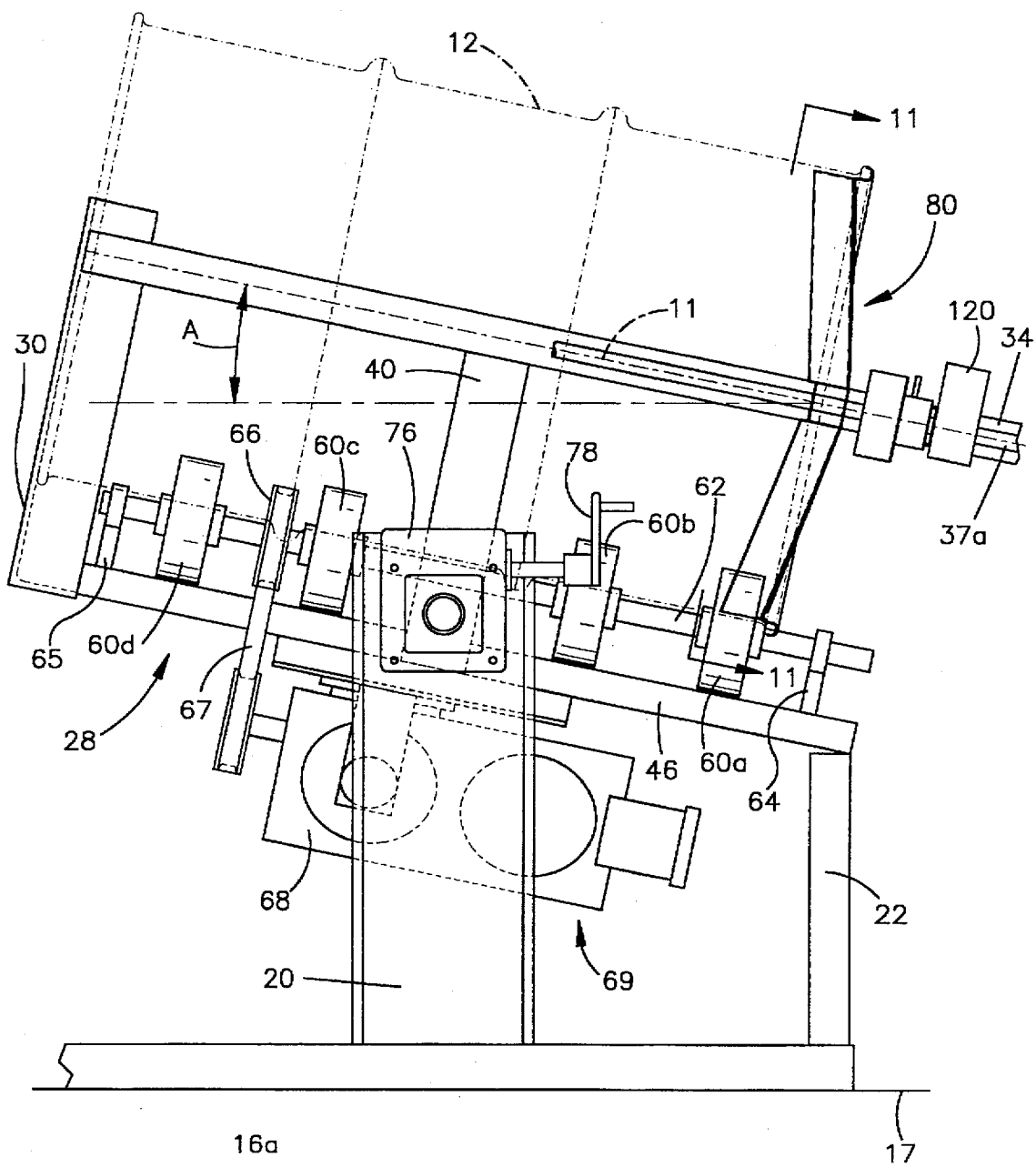
FIG. 10 is a side elevational view of the drum unloader in an unloading position.

Referring to FIGS. 1, 2, 3, and 4, there is illustrated a drum unloader apparatus 10, in accordance with one preferred embodiment of the present invention, for unloading an original, drum-shaped, shipping container 12 (shown in phantom) of coating powder. Drum-shaped container 12 is initially loaded onto drum unloader 10 in a vertical position as shown in FIG. 1. Shipping container 12 is typically a fifty five (55) gallon drum-shaped container but can be of various sizes and typically contains about 200 pounds of powder coating material. However, the specific size of drum-shaped container 12 is not an integral part of the invention and unloader 10 can be sized to accommodate containers having a wide range of diameters and lengths. After loading, the original cover of the drum is removed and replaced with a cover assembly 80. Unloader 10 then tilts the drum-shaped container 12, as shown in FIG. 10, and rolls the drum about its vertical axis 11 while the powder is pumped out.

Figure 2:
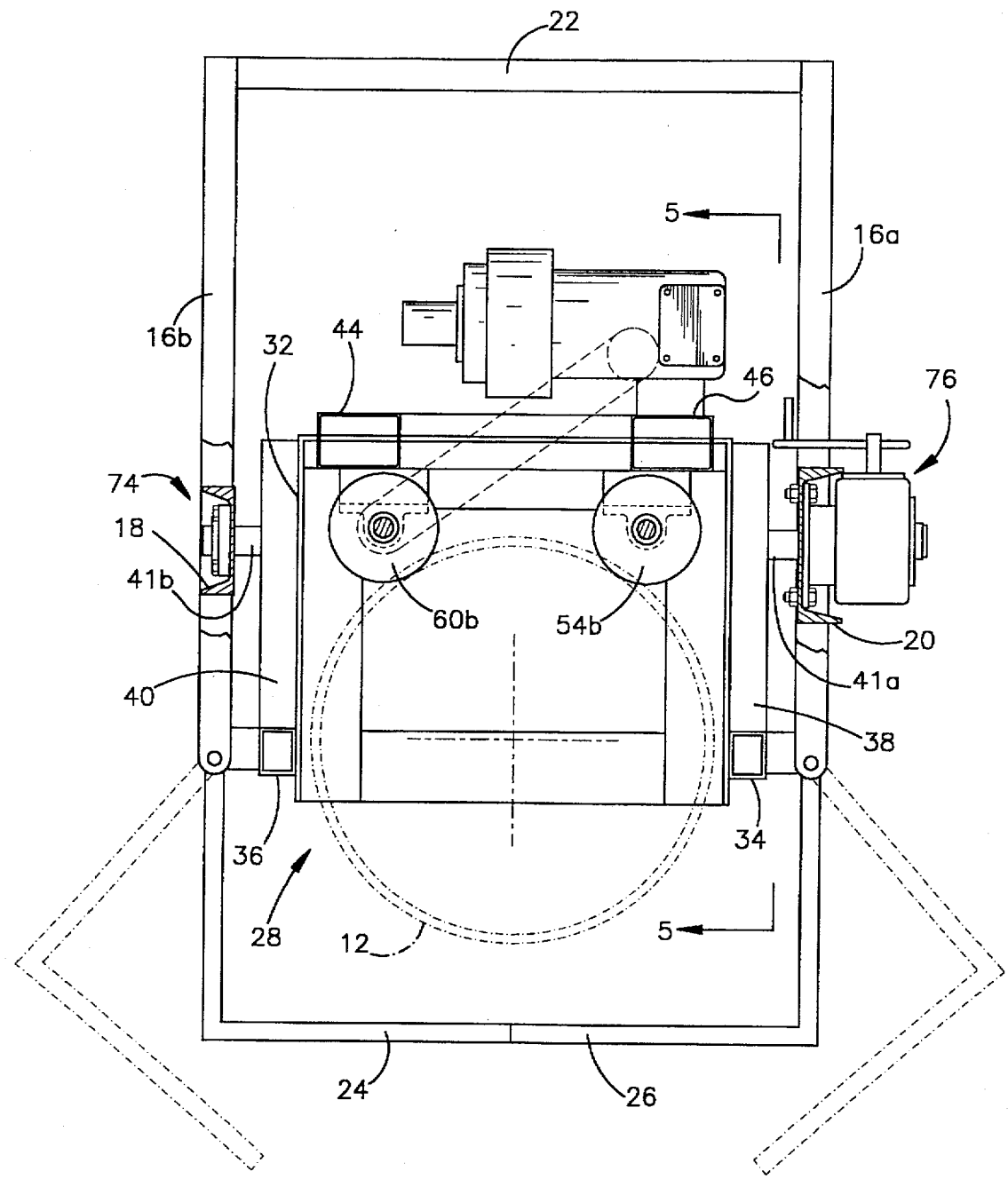
FIG. 2 is a plan view of the drum unloader of the present invention, in partial cross-section, taken along line 2—2 of FIG. 1.

The drum unloader assembly 10 has a stationary support structure 14 including two parallel base supports 16a, 16b and a cross support 15 which rest on a surface 17, two upstanding side walls 18 and 20 secured to base plates 16a, 16b, respectively and a rear wall 22 secured to the rear ends of side plates 18 and 20 as seen in FIG. 2. V-shaped doors 24 and 26 are pivotally secured to the free ends of base supports 16a, 16b, respectively, and are closed to completely screen off drum-shaped container 12 on the moving structural components during unloading to protect the operator, and are opened to load in a full drum-shaped container or to remove an empty drum-shaped container, as described in more detail below.

Figure 3:
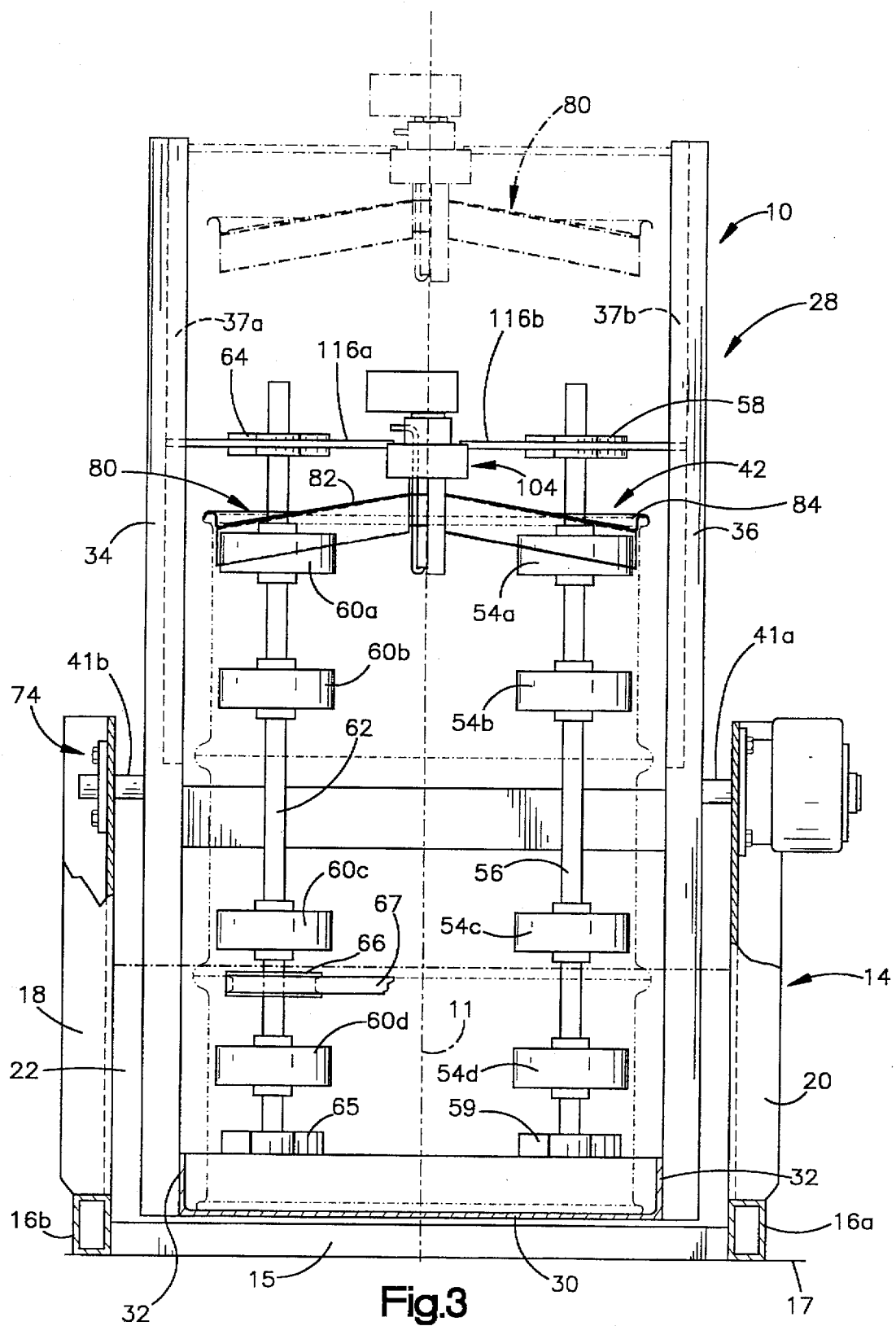
FIG. 3 is a side elevational view of the drum unloader shown in FIG. 1.
Figure 4:
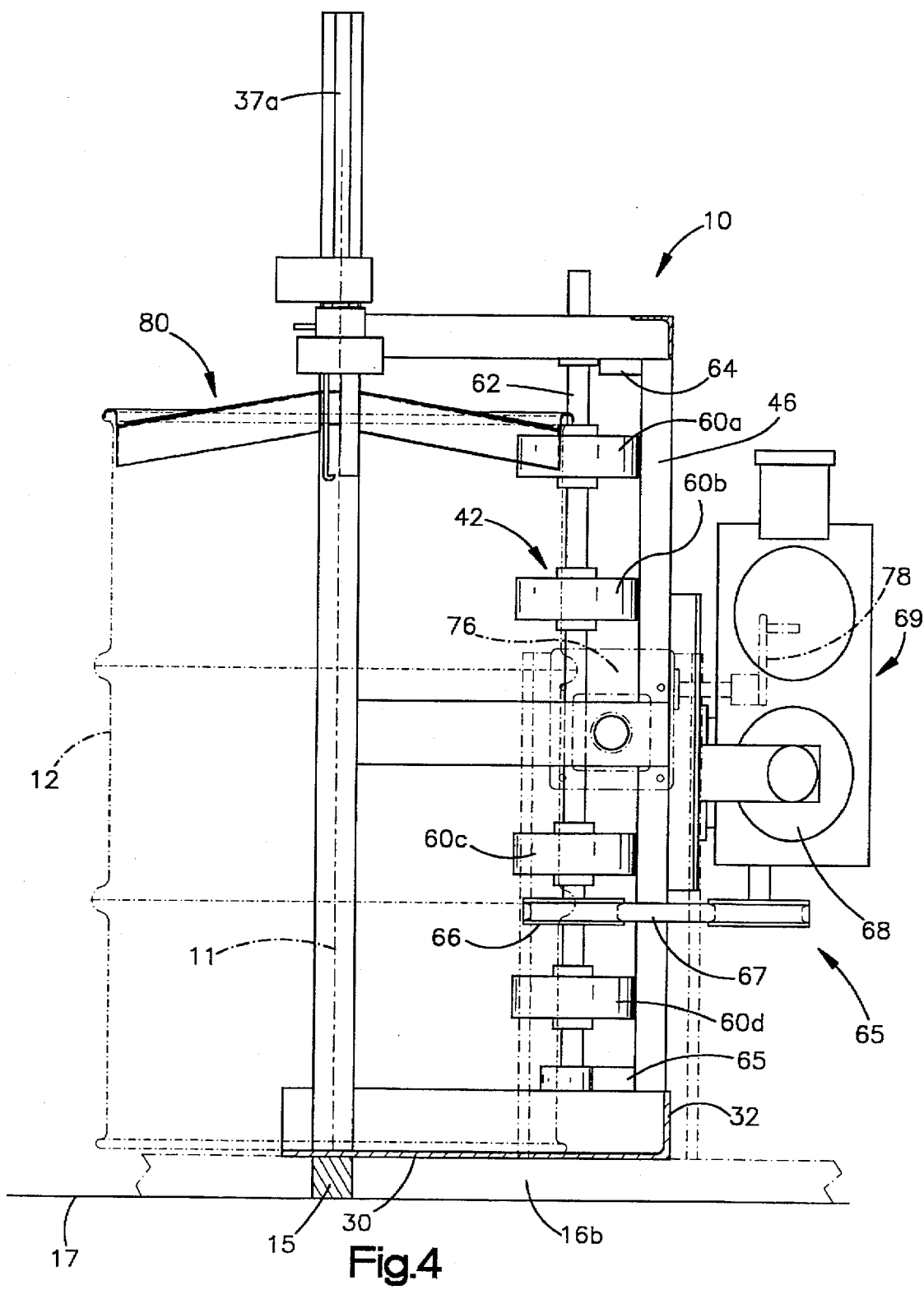
FIG. 4 is a side elevational view, in partial cross-section, taken along line 4—4 of FIG. 1, showing the tilt drum assembly.

A drum tilt frame 28 is pivotally secured to the support structure 14 for tilting a shipping container 12 loaded thereon about its axis 11. The drum tilt frame 28 has a rectangular base plate 30 with an upstanding peripheral wall 32 about three sides of base 30 onto which a bottom end of container 12 is seated. The container is typically loaded onto base plate 30 across the side without wall 32. When tilt frame 28 is in an upright position, as shown in FIGS. 1, 3, 4, rectangular base plate 30 abuts against cross member 15 to prevent the base plate from tilting forward and causing the drum to slide off. When tilt frame 28 is pivoted into an unloading position, as shown in FIG. 10, the tilt frame can rest against a support such as rear wall 22, as shown. Tilt frame 28 has upright columns 34 and 36 that are secured toward the forward end of base plate 30, as shown in FIG. 2. Support arms 38 and 40 are secured to columns 34 and 36 and extend towards rear wall 22. Longitudinal slots 37a and 37b are provided in columns 34 and 36, respectively, (See FIG. 1) in facing relation to each other. Shaft members 41a and 41b are rotatably secured at one end to side walls 20 and 18, respectively, and at the opposite end to support arms 38 and 40, respectively (see FIG. 2). Shaft members 41a and 41b pivotally secure tilt frame 28 to support structure 14, as described in detail below.

Figure 9:
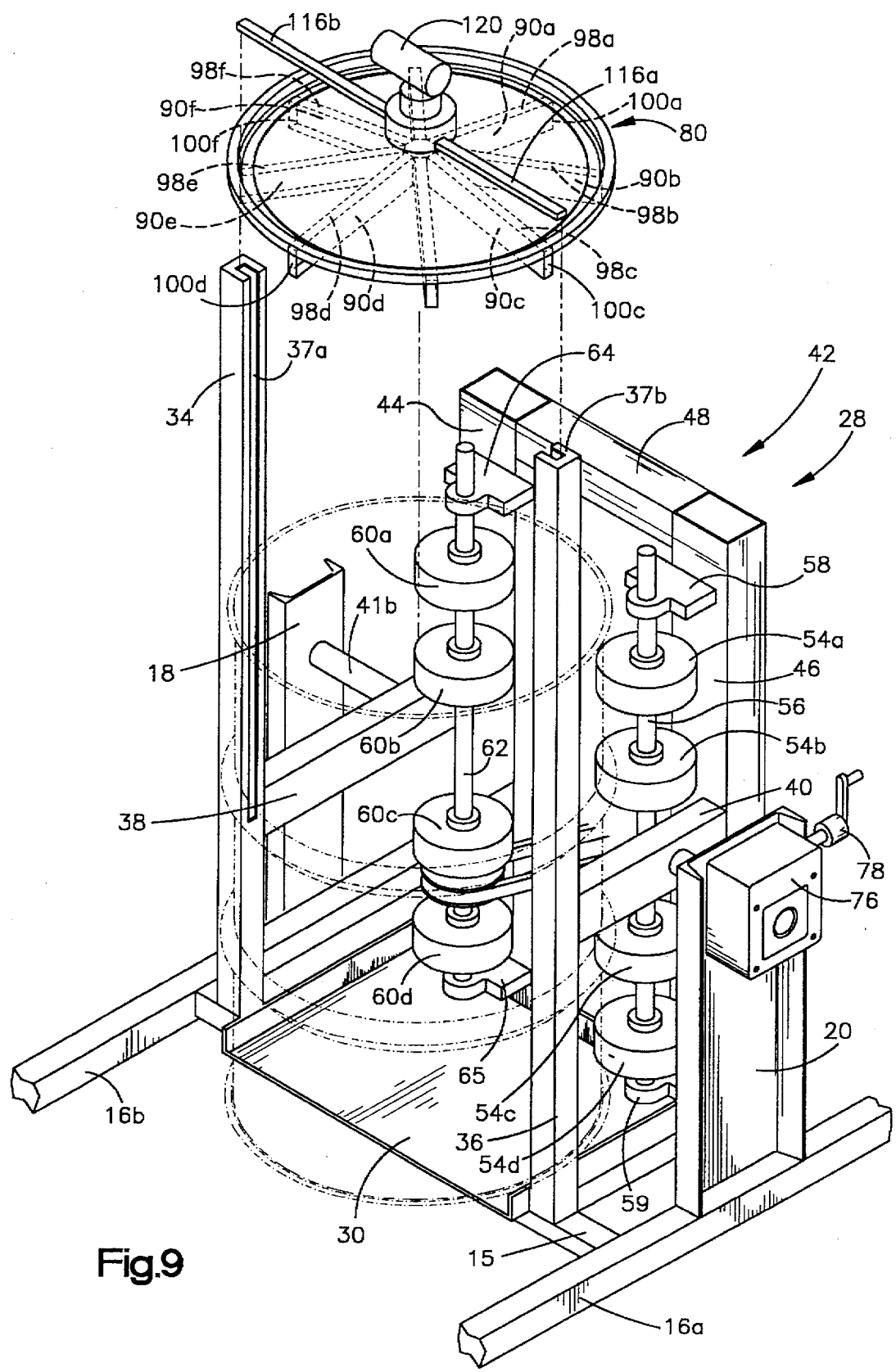
FIG. 9 is a partial, perspective illustration of the drum unloader with an exploded view of the cover assembly.

The drum tilt frame 28 includes a drum roller assembly 42 which has spaced drive wheel and idle wheel support plates 44 and 46, respectively, as shown in FIG. 9. The lower end of the drive roller and idle roller support plates 44 and 46 are mounted to rectangular base plate 30, and their upper ends are secured to each other by cross beam 48. Drum roller assembly 42 includes idle rollers 54a, 54b, 54c, 54d (54a–54d) that are rotatably secured with respect to each other on an elongated shaft 56. Shaft 56 can be spring biased (not shown) towards the drum so that the idle rollers 54a–54d engage a drum which is out of round. Shaft 56 is mounted between shaft supports 58 and 59 which in turn are mounted at either end of support plate 46.

Drive roller support plate 44 has drive rollers 60a, 60b, 60c, 60d (60a–60d) securely mounted to a drive shaft member 62 which in turn is mounted on rotary bearing support members 64 and 65 that are attached to support plate 44. Both the drive rollers 60a–60d and the idle rollers 54a–54d can be constructed of rubber or an elastomer. Also, as shown in FIG. 4, a drive apparatus 65 for rotating said pulley 66 is securely affixed to drive shaft 62 for rotating drive shaft 62 with a belt 67 operated by a belt drive 68. Belt drive 68 is powered by a conventional motor and gear reducer 69, such as a 230 volt 3-phase motor that operates at about one horsepower at speeds between about 10 and 40 revolutions per minute. Motor and gear reducer 69 is mounted to idle roller support plate 46.

Drum tilt frame 28 is pivotally mounted by shaft members 41a and 41b which are secured at one end to support arms 38 and 40, respectively. The free end of shaft member 41b is mounted within a bearing assembly 74 which in turn is secured to side plate 18 (see FIG. 1). The shaft member 41a, extending in a diametrically opposite direction from shaft member 41b, is affixed to a conventional worm gear, tilt box assembly 76 which can have a 60:1 reduction worm gear. Tilt box assembly 76 can be manually operated by turning a crank 78 (See FIG. 9) which in turn rotates shaft member 41a so that drum tilt frame 28 is rotated from a vertical position, as illustrated in FIGS. 1–4 and 9, to a drum unloading position, as shown in FIG. 10 and discussed in detail below.

An important aspect of the present invention relates to a drum unloader cover assembly 80 which is mounted to the drum tilt frame 28 for movement between a drum loading position, shown in phantom in FIGS. 1 and 3, and a drum unloading position, shown in phantom in FIG. 10. In the drum loading position, drum unloader cover assembly 80 is spaced above the top end of drum container 12 which is closed and sealed with an original removable lid (not shown). After the original lid is removed, cover assembly 80 is lowered into the drum unloading position and fitted within the top end of drum container 12 as a replacement for the original lid.

Drum unloader cover assembly 80, as illustrated in FIGS. 5 and 6, includes a circular, cone-shaped cover 82 having an arcuate flange 84 secured around the outer periphery of cover 82 for securing the cover assembly 80 to the ring-shaped end about the top end of container 12. A vacuum breaker or vent 83, having a bore therethrough, is provided in the cover 82. A central opening 88 extends through the center of cover 82. A cylindrical, outlet tube 85, as seen in FIG. 8, is attached to the upper top surface 100 of cover 82 and projects outward in coaxial relation with longitudinal axis 89 through central opening 88.

The drum unloader cover assembly 80 has a plurality of U-shaped channels 90a, 90b, 90c, 90d, 90e, 90f, 90g, 90h, (90a–90h) that are mounted to the bottom inside surface 92 of cover 82 and extend radially outward from central opening 88 to the outer peripheral surface 93. As illustrated in FIG. 6A, each of the channels 90a–90h is formed of a substantially U-shaped elongated channel constructed of a bottom section 94a, 94b, 94c, 94d, 94e, 94f, 94g, and 94h (94a–94h) and spaced side sections, only 96c and 98c are shown. U-shaped channels 90a–90h are secured to the bottom surface 92 of cover 82, as shown in FIG. 9. At the outer end of each channel 90a–90h is a closure plate 100a, 100b, 100c, 100d, 100e, 100f, 100g, and 100h (100a–100h). Channels 90a–90h are mounted to the bottom surface 92 of cover 82 so that the open side of each channel begins to face upward starting at the 6 o'clock position in FIG. 11 as the cover turns in a counterclockwise direction. This is discussed in more detail below. While a channel with a U-shaped cross section is disclosed, it is also within the terms of the invention to substitute channels having other cross-sectional shapes such as V-shaped or semi-circular shaped channels. While eight channels 90a–90h are illustrated, it is also within the terms of the invention to use more or less channels as desired. Preferably, the channels are always located at an equal angle with respect to each other to provide a constant flow of powder to the central opening 88 through cover 82 as discussed below.

A bearing assembly 104, as shown in FIGS. 8 and 8A, is mounted on outlet tube 84. Bearing assembly 104 is constructed of a bearing housing 105 containing a bearing hub 106 pressed against tube 85 and a bearing 107 between bearing hub 106 and bearing housing 105. Bearing housing 105 has an inlet opening 109 and an outlet opening 121.

An elongated, tongue shaped member 110, as seen in FIG. 8, extends through central opening 88 and has a semi-circular collar 112 at one end which is secured to bearing housing 105. A section 114 of tongue member 110 extends below channels 90a–90h as cover 82 turns about centerline 89. Tongue member 110 has an arcuate cross section, as illustrated in FIG. 8A. The tongue 110 is secured to bearing housing 105 and does not rotate with the cover 82 because bearing assembly 104 is prevented from rotating, as discussed in more detail below.

Securing rods 116a and 116b (See FIG. 5) are secured their inner ends, 117a and 117b, respectively, to bearing housing 105 and extend outward in diametrically opposed directions so that their outer ends 118a and 118b, respectively, are received in slots 37a and 37b, respectively.

A powder transporting device, such as a vacuum powder pump 120 is mounted to cover assembly 80 by insertion in outlet bore 121 of bearing assembly 104. The vacuum pump 120 can be a conventional transfer pump or a vacuum pump, such as a Transfer Pump Part Number 281265, available from Nordson Corporation, Amherst, Ohio. The pump is connected to a compressed air line (not shown) to pump the powder into a transport hose 127 to a feed hopper for sieving the powder. The powder is then pumped from the feed hopper to a spray gun. If desired, hose 127 can be connected directly to a spray gun.

While a single pump can effectively unload a container 12, it is sometimes desirable to concurrently provide two or more flow rates of the powder being pumped from the container. In that event, it is within the terms of the invention to connect cover assembly 80 to a plurality of powder pumps, and if desired, each with different flow rates. For example, as illustrated in FIG. 7, a bifurcated pump connector 122 can be constructed with an inlet tube 123 that is adapted to be received in the outlet opening 121 of bearing assembly 104. The inlet tube 123 is bifurcated into flow channels 124 and 126. Pumps 120a and 120b, which can be substantially identical to pump 120, are connected to the outlet openings of channels 124 and 126 for pumping the powder through tubes 127a and 127b, respectively, to a desired location such as a feed hopper.

Another important aspect of the invention relates to a bleeder tube 130 which is mounted in bearing assembly 104, as shown in FIG. 8. Bleeder tube 130 has an inlet end section 132 projecting through an opening in the wall of bearing housing 105 and an outlet end section 134 disposed below channels 90a–90h to provide makeup air within container 12 as the powder is evacuated with one or more pumps 120. Bleeder tube 130 includes an outlet section 136 which curves backward to overlie section 134 in spaced relation above the tongue member 110. An outlet opening 138 directs a stream of air drawn through inlet opening 140 in the vicinity of central outlet opening 121 and across powder deposited on tongue member 110 to blow the powder through outlet opening 121 and into pump 120. Pump 120 is at the same time drawing the powder into the pump inlet by suction.

Figure 12:
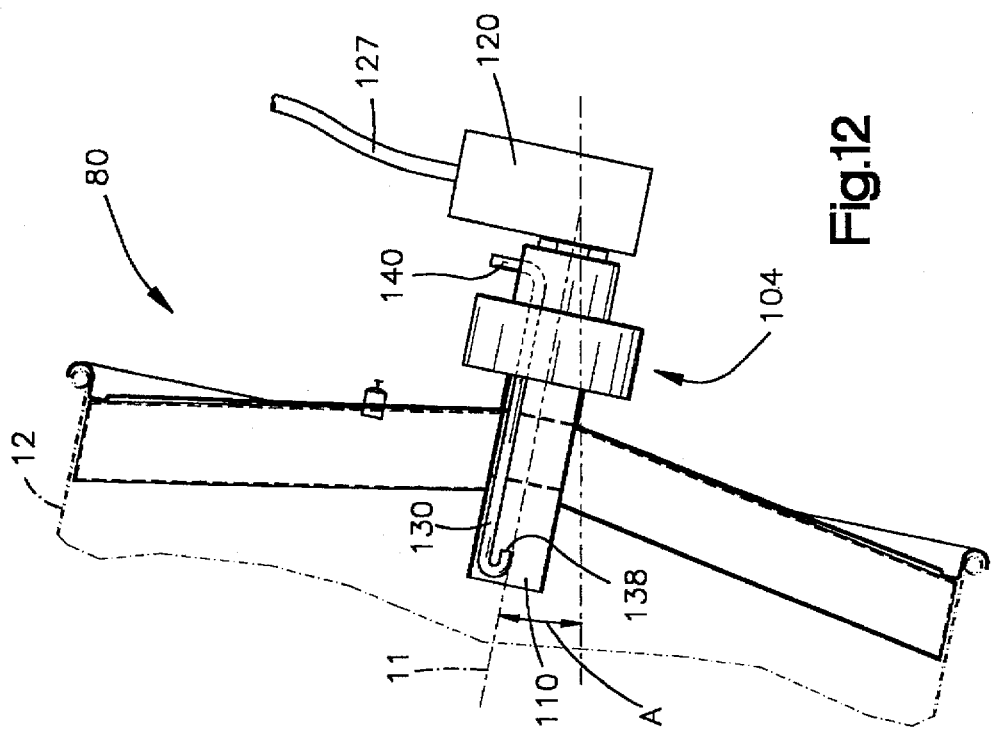
FIG. 12 shows a side elevational view of the cover assembly in the unloading position.

In operation, drum-shaped shipping container 12, shown in phantom lines in FIG. 9, is positioned on the rectangular lower plate 30 of the drum tilt frame 28 and nestled between the drive rollers 60a–60d and the idler rollers 54a–54d. Then, the original lid for container 12 is removed while the cover assembly 80 is in its retracted position, as illustrated in FIG. 1, with rods 116a and 116b in slots 37a and 37b, respectively. Next, an operator lowers cover assembly 80 into the now open top end of container 12 so that flange 84 is secured to the top of the container and channels 90a–90h are enclosed in container 12, as shown in FIG. 1. The transfer pump 120 is next installed in cover assembly 80. Continuing, the operator turns crank 78 and rotates drum tilt frame 28 about shaft members 41a and 41b to a position with respect to support structure 14, as illustrated in FIGS. 10 and 12, where the axis 11 is at an angle "A" of about five to fifteen degrees and preferably about ten degrees, to the horizontal. When turning the drum tilt mechanism with crank 78 on a 60:1 gear box 76, approximately sixteen rotations are needed to move drum container 12 from the vertical position to the tilted unloading position. It is understood that tilt frame 28 rotates within stationary support structure 14 approximately 100 degrees. Once drum 12 is at the desired angle of tilt, the drum is rotated or rolled about axis 11, by operating motor and gear reducer 69 which rotates drive shaft 62 and drive rollers 60a–60d through belt 67 to cause drum 12 to rotate about axis 11 at a desired rate, such as about 12 revolutions per minute.

As drum 12 is rotating, the powder falls through air within the drum and folds over to initiate and maintain air entrainment throughout the powder mass. This "fluidized" powder seeks to maintain a level condition within the drum.

While drum 12 is rotating, the bearing assembly 104 is held stationary because rods 116a and 116b are prevented from rotating because their outer ends 118a and 118b, respectively, are engaged within slots 37a and 37b, respectively, of columns 34 and 36 of support structure 14. The bearing assembly 104, besides preventing movement of powder pump 120 and tongue 110 and tube 130 during the rotation of drum 12 about axis 11, acts as a rotational bearing to reduce the amount of heat generated, which in turn could otherwise adversely affect the coating characteristics of the powder flowing therethrough. An effective rotational bearing is particularly important because whenever container 12 is tilted with its bottom end above the top end, the weight of the powder in the drum increases the load on bearing assembly 104.

Figure 11:
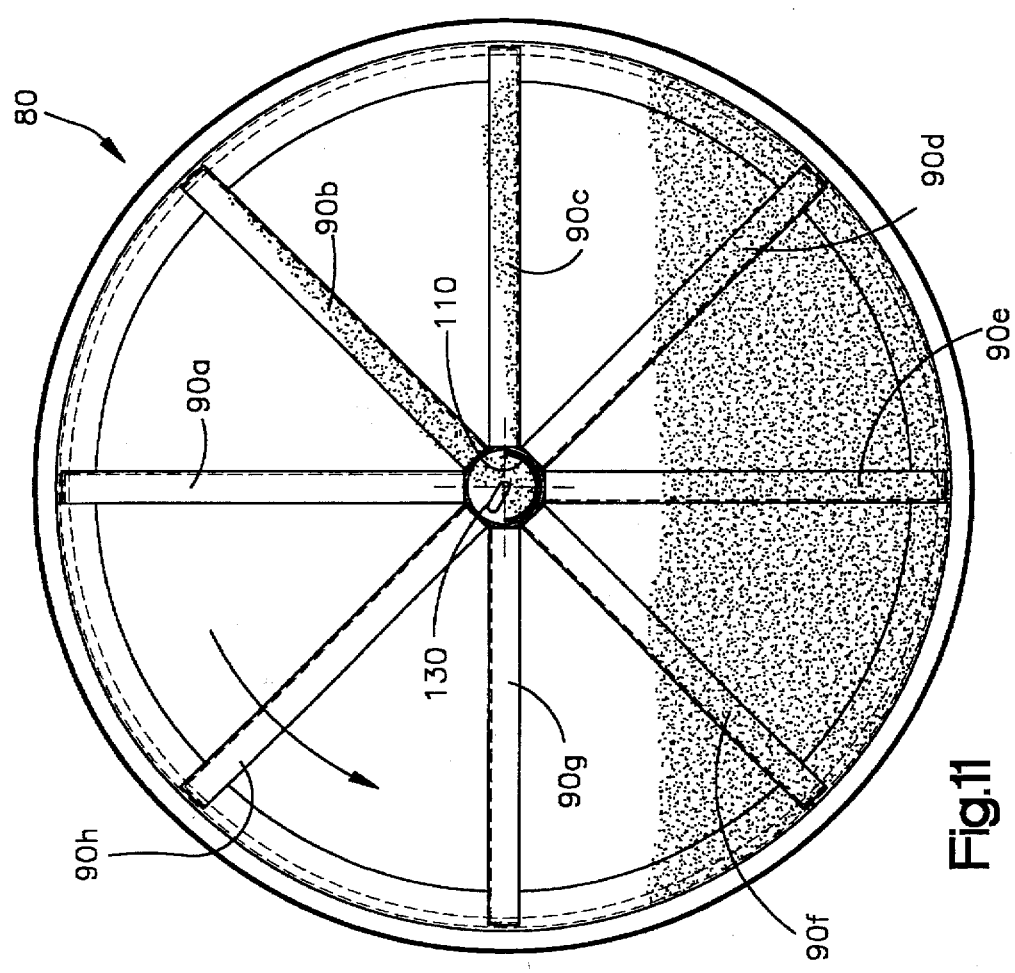
FIG. 11 is a view taken along lines 11—11 of the cover assembly of FIG. 10.

As long as drum 12 is more than half full of powder, the powder level is higher than central opening 88 and can be easily drawn out of drum 12 by powder pump 120 and delivered through air hose 127 to a feed hopper. The rate that the powder is transferred is dependent upon the pump capacity and the pressure and volume of the air flowing through bleed tube 130. During this stage of operation, the air flowing through the bleed tube 130 continually pushes the powder on tongue member 110 towards transfer pump 120. The operation of cover assembly 80, as shown in FIG. 11, becomes particularly important after the powder level falls below the central opening 88. Then, with the relatively low powder levels, the powder pump 120 begins to lose its ability to draw the powder from the container. As the powder level drops even further below the central opening 88, the ability to evacuate the powder from the container becomes increasingly more difficult.

The unique cover assembly 80 of the present invention overcomes this problem. As cover 82 rotates in the counterclockwise direction, as shown in FIG. 11, the open side of U-shaped channels 90a–90h rotates through the coating powder, see channels 90d, 90e, and 90f in FIG. 11, and draws or scoops the powder up as cover 82 continues to rotate. As each channel moves between the horizontal position of channel 90c and the vertical position of channel 90a, the powder slides or falls down the channel onto the pickup tongue member 110 so that the suction from powder pump 120 and a flow of air through bleed tube 130 cooperate to easily transport the powder from tongue member 110, through outlet opening 121 and into hose 127 to a desired location. The flow of air through bleed tube 130 is from a source of pressurized air, typically at a pressure of about 5 to about 15 psi.

Figure 13:
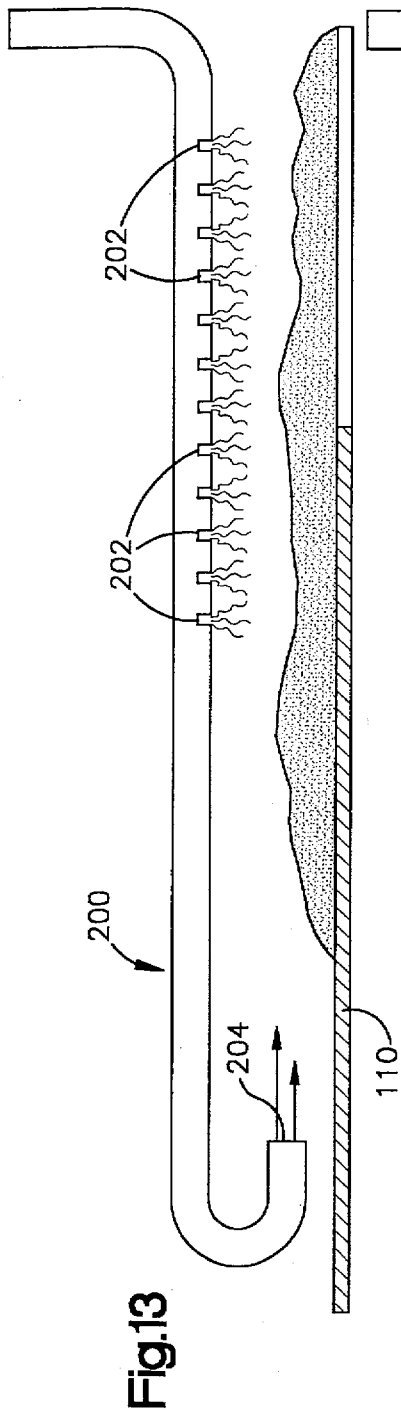
FIG. 13 is a side elevational view of a second embodiment of an air assist tube positioned above the tongue member.

While bleed tube 130 is effective to blow the collected powder through outlet tube 85 and into pump 120 in most conditions, in some cases the suction from transfer pump 120 can cause an excessive air flow across tongue member 110 which would effectively prevent the powder from being drawn into the pump. To overcome this problem, FIG. 13 shows a second embodiment of an air assist tube 200 which is substantially the same as tube 130, except for the addition of openings 202, such as circular openings or a plurality of semicircular slots in the lower surface of tube 200, to direct the spaced pressurized air jets downward against the collected powder in order to cause air turbulence and thereby agitate the powder and keep it from building up on tongue member 110. As with tube 130, pressurized air is also directed through opening 204 toward the powder on tongue member 110 to assist in transporting the powder through outlet opening 83 and into the powder pump.

Figure 14:
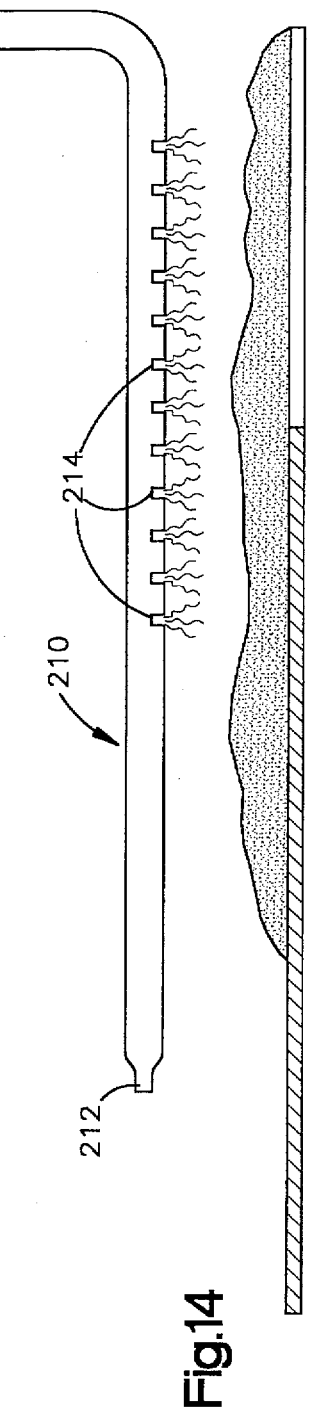
FIG. 14 is a side elevational view of a third embodiment of an air assist tube positioned above the tongue member.

In a third embodiment of an air assist tube, as illustrated in FIG. 14, tube 210 is similar to tube 200, except a restricted exhaust opening 212 directs air away from outlet tube 83 so that only the air through the slot openings 214, which are substantially the same as openings 202, cause agitation of the powder collected on tongue 110. the remaining air flowing through exhaust into the drum 12 acts as make-up air to keep the powder fluidized as the drum continues to rotate as it is being unloaded.

Figure 15:
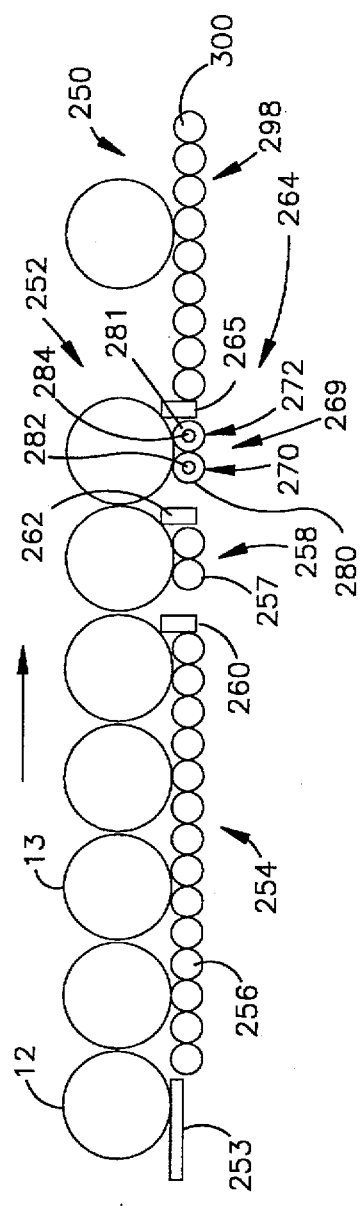
FIG. 15 shows a schematic illustration of an automatic delivery system for a plurality of drums.

While drum unloader 10, as previously described, is effective for supporting and unloading powder from one drum shaped shipping container at a time, it is also within the terms of the present invention to provide a system 250 for automatically transferring a plurality of drum shaped containers 12, one at a time, to an unloading station 252 where the powder is removed from the container. Drum unloading system 250, as illustrated in FIG. 15, includes a laydown table 253 onto which drums 12, typically stored in a vertical, standing position, are tilted over and laid down in a horizontal position. Laydown table 253 is typically constructed with a slightly downward sloping surface so that the drums will freely roll toward a delivery station 254 that includes a plurality of closely spaced rollers 256, extending in a direction normal to the path of drum movement. Delivery station 254 is also positioned in a slightly downward sloping plane so that each of the drums will freely roll down the length of delivery station 254 whenever the next, adjacent, downstream drum container itself rolls in the downstream direction. While delivery station 254 is illustrated as being constructed from a plurality of closely spaced rollers 256, it is within the terms of the invention to use any sloping surface, such as a smooth surfaced ramp to enable the drum shaped containers 12 to freely roll downstream while being unattended by an operator.

A holding station 258 is located directly downstream and adjacent the delivery station 254. Holding station 258 includes rollers 257 which allow a drum container to freely roll, while unattended, from delivery section 254 into holding station 258. Entrance and exit stop pins 260 and 262, which can be automatically controlled, are provided at the entrance and exit sides of holding station 258. The entrance stop pin 260 is normally in the up position, as shown, to prevent the upstream containers from rolling into the next drum shaped container, already located within holding station 258, as the latter container exits station 258 and rolls into the unloading station 252. The exit stop pin 262 prevents the drum shaped container within holding station 258 from rolling into unloading station 252 whenever a drum shaped container is already present in unloading station 252.

Figure 16:
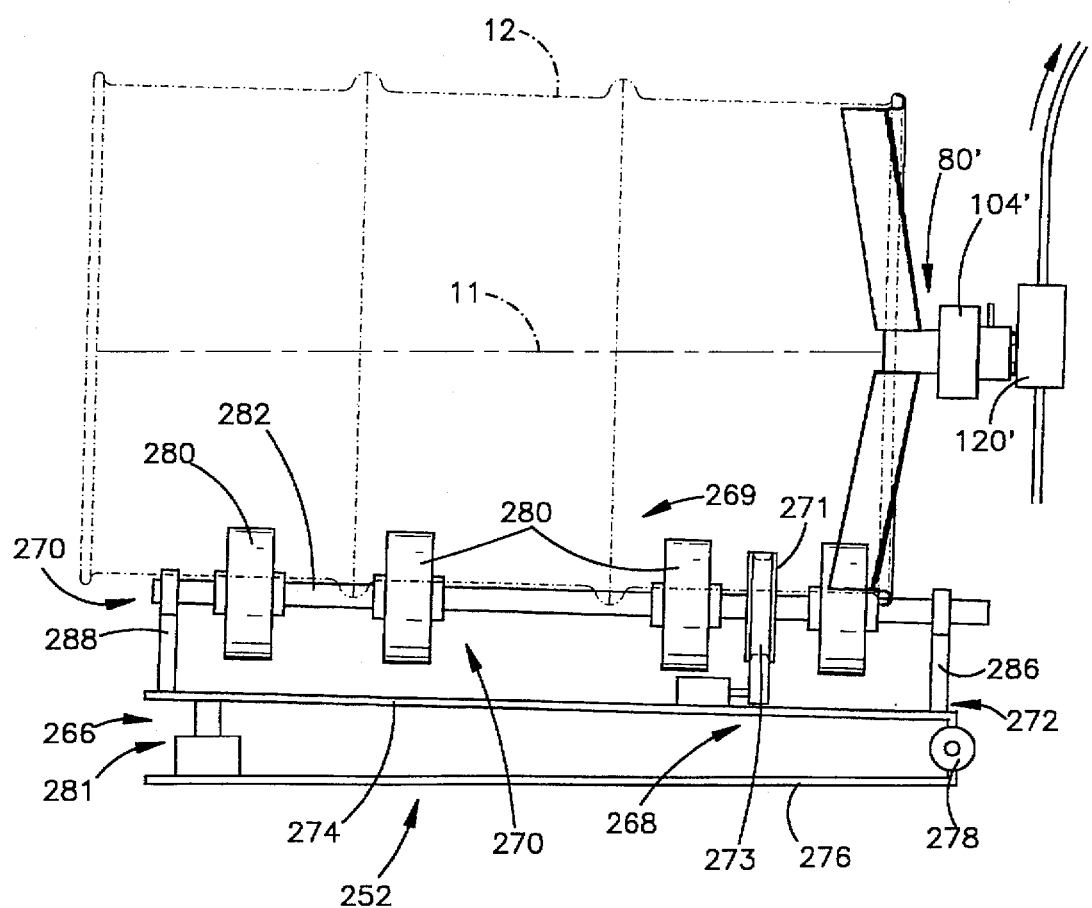
FIG. 16 is a schematic illustration of a drum container in the unloading section of the automatic delivery system shown in FIG. 15.

Unloading station 252 includes a tilt table 266, a drive assembly 268, and a drive roller assembly 269, as schematically illustrated in FIG. 16. The drive roller assembly 269 includes a drive roller section 270 having drive rollers 280 mounted on an axle 282 and an idle roller section 272 including idle rollers 272 mounted on an axle 284 (see FIG. 15). The drive roller assembly 269 is mounted on a tiltable plate 274 of tilt table 266. Tiltable plate 274 is pivotally secured to a stationary plate 276 of tilt table 266 at a pivot point 278. An actuator, such as an air cylinder 281, moves plate 274 from horizontal to an unloading position wherein the axis 11 through drum 12 is at about a 10 degree angle with respect to horizontal. The drive roller and idle roller sections 270 and 272, respectively, have drive rollers 280 and idle rollers 281 mounted on axles 282 and 284, respectively, in the same manner as the drive and idle wheels shown in the first embodiment of the invention described before. Drive assembly 268, which can include a motor and gear reducer, turns axle 282 and the attached drive rollers 280 through a drive belt 273 and pulley 271 in a similar manner as previously discussed with regard to the belt drive 68 of the first embodiment of the invention.

Another feature of the unloading section 252 is the ability to automatically unload the drum-shaped containers from holding station 258. To accomplish this, axles 282 and 284 of the drive and idle roller sections 270 and 272, respectively, are lowered towards plate 274 into a loading position below rollers 257 in holding station 258. The axles 282 and 284 can be lowered towards tiltable plate 274 by means such as air cylinders 286 and 288 which support the ends of each of the axles 282 and 284, respectively. When air cylinders 286 and 288 are in the loading position with rollers 280 and 281 located below the rollers 257, the stop element 262 is lowered into a down position so that a drum-shaped container in holding station 258 easily and freely rolls onto the drive and idle rollers 280 and 281 of roller sections 270 and 272, respectively. The container is prevented from rolling out of unloading station 252 by stop element 265. Then, after stop 262 is moved back into the up position, the drive and idle roller sections 270 and 272 can be moved upward to the rolling position, as shown in FIG. 15, by means of air cylinders 286 and 288, as discussed in more detail below.

System 250 includes an outfeed station 298 comprising a plurality of rollers 300 which are disposed adjacent to each other and at a slight downward sloping angle similar to the rollers 256 in delivery station 254, as previously discussed.

In operation, the original lids are removed from the drum shaped containers while they are stored in a standing, vertical position. Then, a cover assembly 80' including bearing assembly 104' is attached to the open top end of container 12 as previously described. Throughout the specification, primed numbers represent structural elements which are substantially identical to structural elements represented by the same unprimed number. Next, the containers with the unloading covers 80' secured thereon are placed horizontally on laydown table 253 and aligned to freely roll into the delivery station 254. Each incoming drum container 12 will come to a resting stop when it abuts against stop pin 260 or a drum container. The drum containers in the delivery station 254 are supported by rollers 256 which are mounted at a slight downward slope towards the holding station 258 so that the drum shaped containers will freely roll until they engage another drum shaped container or stop pin 260 at the inlet of holding station 258. When the unloading station 252 is empty, the exit stop pin 262 is lowered and the drum shaped container within holding station 258 will freely roll into the unloading station 252. A stop pin 265, which can be automatically controlled, at the exit side of unloading station 252 prevents the drum shaped container from moving directly into the outfeed station 298. To ensure that the drum shaped container within the holding station 258 freely rolls into the unloading station 252, the drive and idle roller sections 270 and 272, respectively, are lowered below rollers 257 in the holding station 258.

Then, after the drum shaped container to be unloaded is in unloading station 252, the stop pin 262 is moved up so that the drum shaped container within station 252 is secured between two stop pins 262 and 265. Then, stop pin 260 is lowered and the next adjacent drum shaped container in station 254 rolls automatically into the holding station 258. Then, stop pin 260 is again moved up into position.

After the drum shaped container to be unloaded is in unloading station 252, the pump 120' (see FIG. 16) is now installed by an operator into a bearing assembly 104'. The pump 120' can be secured against rotation by any suitable fixture (not shown) mounted at unloading station 252. Tilt table 266, prior to receiving a loaded container from holding station 258, has roller sections 270 and 272 located slightly below rollers 256 so that a drum shaped container can easily and freely roll onto the drive and idle rollers 280 and 281 after stop pin 262 is lowered. After a full powder drum container is in position, nestled on both the drive and idle rollers 280 and 281, stop pin 262 which can be automatically controlled moves upward and prevents the next, upstream drum shaped container from rolling into the unloading station 252. With a full drum shaped container in place on tilt table 266, the drive and idle roller sections 270,272 move upwards to the rolling position and plate 274 of table 266 pivots about pivot point 278 so that the bottom end of container 12 is disposed at a slightly higher position than the top end of container 12. As in the first embodiment, the longitudinal axis 11 through container 12 as well as an axis through axles 282 and 284 is at about 10 degrees with respect to the horizontal. With container 12 in position on table 266, the drive assembly 268 begins to turn and rotate the container 12 to keep the powder from compacting. Then air is supplied to pump 120' to pump the powder out of the drum. When the drum is empty, an operator removes the pump from the drum and the empty drum is allowed to roll into outfeed station 298. Then the next full drum is rolled into the unloading station 252 and the cycle repeats itself.

It is apparent that there has been provided in accordance with this invention an apparatus and method for unloading powder from a drum shaped container that satisfy the objects, means and advantages set forth hereinbefore. For example, while the invention has been described in its most preferred embodiment wherein a drum-shaped container of powder is tilted and rolled while being unloaded, it is within the scope of the invention to provide a system which allows a plurality of the containers of powder to roll down a delivery section to a holding station, into an unloading station for evacuating the powder, and to an outfeed station after the container is empty.

While the invention has been described in one preferred embodiment and in various alternative embodiments, it is evident that many other alternatives, modifications, and variations will be apparent to those skilled in the art in light of the foregoing description. Accordingly, the invention is intended to embrace all such alternatives, modifications and variations as fall within the spirit and scope of the appended claims.

We claim:

1. An apparatus for unloading powder from a drum shaped container, said drum shaped container having a long axis, said apparatus comprising:

a drum unloader assembly for supporting said drum shaped container in an unloading position where a top end of said drum shaped container is lower than a bottom end of said drum shaped container;

a cover assembly secured to said top end of said drum shaped container;

a drum roller assembly for rolling said drum shaped container about said long axis; and a powder transporting device connected to said cover assembly.

2. The apparatus of claim 1 including wherein said drum unloader assembly moves said drum shaped container from a substantially vertical loading position to said unloading position.

3. The apparatus of claim 2 wherein said drum unloader assembly comprises:

a stationary support structure; and a drum tilt frame movably secured to said stationary support structure for tilting said drum shaped container from said substantially vertical loading position to said unloading position.

4. The apparatus of claim 1 wherein said cover assembly is a circular cover having a central opening therethrough and a plurality of elongated channels extending radially outward therefrom, said elongated channels each having a first end adjacent said central opening and a second end adjacent to an outer peripheral edge of said circular cover, said second end of said channels being closed by an end plate, said channels being mounted to a bottom surface of said cover for engaging said powder as said drum shaped container rolls.

5. The apparatus of claim 4 wherein said plurality of elongated channels have a generally U-shaped cross section, and each of said channels is mounted to said bottom surface of said cover with an open top side of each of said channels facing a closed, bottom side of an adjacent one of said channels.

6. The apparatus of claim 4 further including:

an outlet tube extending from said central opening and projecting outward from a top surface of said cover; and a bearing assembly mountably secured to said outlet tube, said bearing assembly having an outlet opening for discharging said powder.

7. The apparatus of claim 6 further including a tongue shaped member secured to said bearing assembly and extending through said outlet tube and said central opening, and into said drum shaped container for collecting said powder from a plurality of channels which are mounted to the inside surface of said cover.

8. The apparatus of claim 6 wherein said powder transporting device includes a pump attached to said bearing assembly for evacuating powder from within said drum shaped container.

9. The apparatus of claim 8 wherein said powder transporting device includes two or more pumps connected to said outlet opening of said bearing assembly.

10. The apparatus of claim 6 further including a bleeder tube having an inlet end section located outside of said container and an outlet end section located within said container for directing a stream of air into said container in the vicinity of said central outlet opening.

11. The apparatus of claim 7 wherein said bleeder tube is mounted in said bearing assembly and overlies said tongue shaped member to blow powder collected on said tongue shaped member into said powder transporting device.

12. The apparatus of claim 11 wherein said bleeder tube includes a plurality of openings extending along its length to direct a plurality of spaced air jets directly against said powder collected on said tongue shaped member.

13. The apparatus of claim 3 wherein said drum tilt frame comprises:

a plurality of spaced drive rollers secured to a first shaft member and a plurality of spaced idle rollers secured to a second shaft member said first and second shaft members being rotatably mounted to said drum tilt frame, said plurality of spaced drive rollers and idle rollers being disposed with relation to each other for supporting said drum shaped container in an unloading position with a top end of said drum shaped container lower than a bottom end of said drum shaped container; and a drive apparatus for rotating said first shaft member and said drive rollers.

14. The apparatus of claim 13 wherein said drive apparatus comprises:

a pulley secured to said first shaft;

a motor driven belt drive; and a belt connecting said belt drive and said pulley for rotating said first shaft.

15. The apparatus of claim 3 wherein said drum tilt frame is pivotally mounted by first and second shaft members to said stationary support structure; and a tilt box assembly is mounted to said stationary support structure for moving said drum tilt frame between a vertical position and a tilted drum unloading position.

* * * * *